Patented July 27, 1937

2,088,412

UNITED STATES PATENT OFFICE 2,088,412

PROCESS OF MAKING SELF-IDENTIFYING COMPOSITION OF MATTER

William M. Gresvenor, New York, N. Y.

No Drawing. Application June 24, 1933, Serial No. 677,464

4 Claims. (Cl. 40—2)

This invention relates to new and useful improvements in process of making self-identifying composition of matter, of which the following is a specification:

For many years manufacturers of products such as certain heavy chemicals, greases, paints, heavy oils, plastics, pigments, special clays and the like, as well as other materials, which are shipped in bulk or handled in lots (packaged or otherwise) which are likely to be confused by unskilled labor, have desired a suitable method of identifying any sample of their product (wherever taken) with its corresponding shipment or manufacturing lot number and thus being able to determine its particular date and method of manufacture, packing, shipment, etc., by records entirely within the manufacturer's control.

No practical system has hitherto been devised, so far as I am aware, that does not involve careful segregation of each lot or part of a lot in the hands of each middleman or consumer and also involve the keeping by indifferent and careless outsiders of exhaustive records, for tracing purposes. Individual articles like shoes, gloves, engines, etc., have long been commonly marked for such purposes, but marking of all such goods as are illustrated by the above examples and are generically called bulk materials, has hitherto been regarded as impossible.

One aim of the present invention is to provide a generally adaptable process of marking, as by numbering, lots of bulk material and to produce a product which, even in bulk form wherever found, will be readily identifiable as belonging to one particular lot among groups of several, or several hundred or several thousand lots, and to provide a novel composition of matter by means of which this is made possible.

One of the subjects of the present invention is a novel composition of matter, or product, compounded of two or more ingredients which are distinguishably different from one another by suitable means (preferably such means as are at least roughly quantitative) and which product obtained from any particular batch or lot is self-identifying as belonging to that particular batch or lot, by means of the kind and proportion of said ingredients present therein. The difference in kind need not involve a difference in chemical composition, though it may do so. It may also be merely a difference in optical properties or form or size or some other recognizable characteristic, as well as in proportion or number; provided only that the difference of ingredients in kind and/or proportion, and/or number, be such as to be distinguishable by suitable means, and their combined relation to one another must be determinably different from other contemporaneous lots, or other members of a series of lots of similar material produced by the same manufacturer.

Another of the subjects of the present invention is a novel process of manufacturing or preparing such products.

Other subjects of the present invention will appear.

The present product invention comprises a physical composition of matter unique in its make-up for each lot of a series of lots of any kind of bulk material, of which composition the bulk material in one of its ordinary forms constitutes only a part, the other part of the composition consisting of one (or more) characteristically different material (or materials) present in the composition in proportion (or proportions) to the whole composition (or to one another or to both), which characteristic difference and/or proportionality are coordinated with this particular lot and are unlike the proportions of other contemporaneous lots.

The invention also comprises a general process of numbering, marking or similarly identifying a series of batches or lots of the novel composition of matter by using and suitably and proportionally modifying certain special physical properties, such as the magnetic permeability, the microscopic appearance or other special optical behavior or other determinable peculiarity, etc. thereof.

The process may, obviously, be applied to a wide variety of materials to make them self-identifying in bulk, and the resulting self-identifying composition may then be packaged with or without further marks on the package so that the process and composition are entirely suitable for packaged goods and, in many instances, this method of marking is more useful and effective than the marking of the packages. The invention accomplishes this self-identifying result in such a manner that a small quantity of the material wherever found may be identified when examined with the microscope, spectroscope, fluoroscope or other instrument (preferably, though not necessarily, of optical character) according to the particular choice of characteristic substance or substances compounded therein. Thus, for example, examination under suitable illumination exhibits a quantity (or several quantities) of effect (e. g. a proportion, number or strength) of a particular kind (or of several distinguishable kinds) of effect (e. g. with respect to color, size, spectral bands by absorption or reflection, kind of fluorescence, etc.) per unit of material to be identified, and/or exhibits a relative quantity or proportion of effect of the several differing kinds to one another, the combination of which will serve to identify the lot of the novel composition when examined.

This result may, among other ways, be attained by commingling as uniformly as possible through the composition a number (a) of one kind of particles (A), and/or a number (b) of another kind of particles (B), and if desired further numbers, (c), (d), (e), etc. of kinds C, D, E, etc. respectively, each of a different kind of particle, which are distinguishable in kind and measurable in quantity or degree of effect. For example, they may be visible under the microscope and countable, or may be made otherwise visible and countable or measurable, for example by one of the ways above indicated. By maintaining predetermined quantity-ratios of $$\frac{a}{b} \text{ or } \frac{a}{c} \text{ or } \frac{b}{c} \text{ etc.}$$

e. g. between the number of particles of each kind used, the number of identifiable lots of the composition can be vastly increased. To do this most successively, it is desirable that whatever kind (A) of particles is used the particles shall be clearly distinguishable from the particles (B) and each of these from the particles (C), (D), etc. If, for example, mere difference in size is chosen as the distinguished characteristic of kind between particles of kind (A) and kind (B), that difference should not be shaded, but should be clear and distinctive; that is, practically all particles (A) should be so characteristic in size that there is no possibility of confusing the relative proportion of particles (A) with the proportion of particles (B) when their respective numbers are counted and their approximate ratios to the bulk composition or to one another are determined. Similarly, if the identifying characteristic is color, the different colors chosen should be sufficiently distinctive in hue or shade that confusion shall not arise; or if fluorescence is the characteristic of the particles chosen, their fluorescence should either be excitable by clearly distinguished wave lengths, or the resulting fluorescences should be clearly distinguishable in color. Other properties may obviously be chosen such, for example, as single or double refraction, refractive index, X-ray pattern, magnetic permeability, etc.

As one specific example of the self-identifying composition and method of making the same, and for the purpose of illustrating certain of the underlying principles of the invention of a self-identifying composition, a composition for use as a lubricating grease and method of making the same will be here given. Many lubricating greases are, for the sake of economy, made from materials which are somewhat colored or opaque and, therefore, superficial color or fluorescence may not be satisfactory characteristics upon which to rely for the identification of the various lots of grease composition generally. Practically all of these materials, however, and even the dark colored greases, are rather transparent to light when examined in thin layers under the microscope. Therefore, one suitable illustration of this invention as exemplified in the making of a composition for use as a lubricating grease, is to use as some of the components different sizes, or different proportions, or both, of particles of an opaque solid lubricant such as artificial graphite which is wholly opaque to light even in minute particles. Size may be conveniently chosen as the characteristic of kind of effect, and number of particles chosen as the distinctive measure of quantity of effect. To obtain the distinctive difference in kind (size) of the particles, it is desirable first to screen, float, levigate, or otherwise subdivide these particles into, say ten different groups, e. g. from 0 to 1 thousandth of an inch by successive ten thousandths of an inch, group (A) being under one ten thousandth, and group (B) being from 1 to 2 ten thousandths, and group (C) to (J) similarly arranged up to 10 ten thousandths. It is furthermore also desirable to make the kind (size) of the particles themselves more distinctive, by supplementary sizing. Unless this is done, each of these ten subdivisions borders immediately upon another and may, in fact. overlap it to some extent. Each of these groups, therefore, should again be floated or otherwise separated into three fractions; a finer fraction, a middle fraction, and a coarser fraction. By discarding (or utilizing in an entirely different series of batches) all except the middle fraction of each primary sizegroup, there remain for use in the present specific example of the composition and method of this invention, ten specific and clearly characteristic kinds of particle, (A) to (J) inclusive, practically all particles of any one kind being clearly distinguishable in size from practically all particles of any other kind. All individuals of one kind (size) are thus near enough alike and are also markedly enough different, from the particles of any other kind, that it is easy to count the number of the individual particles of each kind present in a small sample of the self-identifying composition of matter when made up. A predetermined kind, or several kinds, or quantity of one kind, or of each of several kinds of such particles, is then used with other materials of choice to make up a grease of any desired class, and the particles are evenly distributed therethrough by suitably and sufficiently blending the mixture in any stage of its manufacture.

To identify ten or more lot numbers of the self-identifying composition only one kind of particle need be used in ten or more clearly distinguishable different proportions. A determination can then be made of the mere number of particles in a given volume or weight of a lot of the composition and the size need not be particularly considered. Again, any proportion whatever of each of ten different sizes (or more if they have been prepared) may be used to distinguish a limited number of lots. A determination can then be made of the mere size of particles in the composition without regard to the number in a given volume or weight. Thus lots 1 to 10 or more could be identified by the mere size of the single kind of particle used irrespective of its proportion to the composition. Again, the different proportions of any single size of particle may be used for a limited number (ten) of lots and then the next larger size may be similarly used until the ten sizes are thus exhausted, whereby one hundred different lots of the composition can be identified. It is possible, however, to identify lots 1 to 100 by the size and proportions to one another of only two sizes of particle. One size (A) may be used for the first ten numerals of the units order in proportions of 0 to 9, inclusive, e. g. in proportions of .00% to .09%, and the second size (B) used for the second ten numerals in the tens order, and by blending suitable weights or proportions by number of each of the two kinds or sizes, (A) and (B), 100 lots or batches of the composition can be identified including the 00 lot. Similarly, by using proportions or relative numbers of each of the ten sizes, the identification of any one of 9,999,999,999 different lots or batches of the grease composition can be identified.

For most purposes the particle sizes may be used very much coarser, as for example, .01 inch to .02 inch, etc., but the principle is the same. The resulting composition when suitably mounted and examined will show an approximate number or relative proportion of each characteristic kind of particle which bears a predetermined and approximate but distinguishable relation to the lot or batch number of the composition.

If greater ease of distinction is desired, only the sizes (A), (B), (D), and (H) may be used for the distinguishing kinds, and only the proportions 1, 2, 4, and 8 be used for the distinguishing proportions by weight or number of particles of each particular kind in the self-identifying composition. When the composition is then examined it will show more easily the distinguishable number or proportion of particles (degree of effect) of each of the more easily distinguishable sizes (kinds of effect), but even this limited number can be used to identify about 625 batches, and then the intermediate sizes in the original separation of the particles above described may be used for the identification of another 625 lots or batches, giving a total of 1250 lots of this form of the invention which can be clearly and easily distinguished from all others by much more easy measurement and counting.

I am aware that greases containing graphite have been made for many years but the selection and use of the particle size of the graphite, joined with the adjusted number of graphite particles of a given size, coordinated to indicate a definite lot in a series of batches, produces a unique composition of matter in the form of a self-identifying lubricant. This is nowhere suggested in the art, either in principle or in practice, so far as I am aware. The physical arrangement and coordination of its parts render my composition for use as a grease readily distinguishable from any of the previous grease compositions and, furthermore, each batch of grease has a specific name or number of its own in addition to its general class name.

The chemical entity chosen for obtaining the characteristic kind of effect or the range of its amount chosen for obtaining the quantity of effect may, quite apart from this invention, also be chosen to modify or improve the practical utility of the resulting composition of matter.

The ingredient chosen to secure the different kind and the relative amount or proportion of effect, may be the same chemical material (in modified form) which constitutes all other material going to make up the batch.

The same essential peculiarities of composition and principles of manufacture may be applied to different components of identical chemical composition provided one of them has the necessary characteristic physical properties, since fortunately numerous substances crystallize in different systems, or may be prepared in either translucent or opaque form, and also many substances have differing colors by transmitted or reflected light, depending on their physical structure. In such instances, it is obvious that the entire chemical composition of the lot or series of lots of my composition of matter, may be made chemically uniform throughout without modifying the essential characteristic of the new composition made from the two or more varieties of the same chemical substances or modifying the essential principles of compounding the composition.

Thus some different form of substantially the same chemical material may be used as the characteristic identifiable components. For example, the identifiable particles may be crystalline and the balance amorphous, or the same substance in a different system of crystallization may be used. The distinctive shapes, colorations, etc. of particles produced by natural or artificial means may also be utilized.

Various properties cited, such as magnetic permeability, absorption or reflection of selective bands of ether waves such as light or X-rays, the size, color, fluorescence, refractive index or double refraction of the characteristic identifying material in my composition, may be found in such materials as graphite, talc, dyestuffs, colored glass, bentonite, pigments of ground mineral or of lakes, starch, mineral matter, etc., and such material (or materials) may be blended with the components of greases, of oils emulsified or otherwise, of pigments, of paints, of special clays, plastics, etc. of all kinds, to produce a wide variety of my self-identifying composition of matter in accordance with my invention and these may be made up to be adapted to a wide variety of uses. My composition of matter may be solid, plastic, powdered, or liquid, but the physical character of the completed composition must be considered in selecting suitable characteristic materials for blending therein so that segregation or separation shall not interfere with subsequent identification.

Generally speaking, the new composition of matter is characterized in different lots by substantially uniform distribution therein of materials producing predetermined characteristic kinds of effect, or by predetermined proportions of material giving different degrees of a characteristic effect, or by predetermined kinds of characteristic material in predetermined different proportions having a predetermined ratio of effect, any or all of which are related to some standard quantity of the composition. More broadly, the lots of composition have uniformly blended therein materials giving characteristically identifiable kinds and/or degrees of effect having varying and distinctive relation to one another corresponding to varying contemporaneous lots of a series of similar composition. It may be desirable to have either the total amount of composition act as the standard of comparison for quantity of effect, or merely relate the quantity of effect of each kind of material to the quantities of effect produced by other kinds of material. In the specific example, size need not be used as a characteristic of kind. Advantage might be taken of color by using graphite for black, talc for white, and dyestuffs or lakes for other colors. Particles of fluorescent materials might also be used having different colors of fluorescence or fluorescing to different wave lengths, as a criterion of kind, and taking either number of fluorescent points or intensity of fluorescence as a characteristic of degree. A small number of black particles may be mixed with pigments without substantially dulling the shade, or particles of complementary colors approximately matching the shade may be used, or again fluorescence resorted to. Minute particles of ground glass of different colors, or of starch plain or dyed, are also suitable for combination to make suitable self-identifying pigments. There are a number of white substances insoluble in oil showing characteristic fluorescence of different kinds which may be added to the oils of a "ready-mixed paint" regardless of the color of the latter. Materials for identifying lubricating compositions may also be made from a number of different kinds of white substances insoluble in the oil, which are either made extremely fine like bentonite, flaky like minute particles of mica, or given the proper specific gravity by being extremely porous and coated with a material impervious to oil.

(a) Compositions for use as mineral plastics can generally be made almost exclusively of various materials either originally having or having subsequently imparted thereto different kinds of characteristically distinguishable properties. This is particularly true in the colored plastics. The proportion of the particles rendered characteristic makes relatively little difference and can vary from slightly less than 100% to less than 1%.

(b) Where a low percentage of characteristic particles is desired they can be added and a few preliminary tests will generally determine the suitability of several types of characteristic identifying materials which are available for combination with any particular one of the commonly used bulk materials to yield distinctive results in the resulting composition of matter.

Where a high percentage of characteristic particles is desired as in (a) some or all of the ingredients of the mixture may be treated to have characteristically identifiable properties. For example, a portion of a batch can be washed in a solution that makes its particles fluoresce green and another portion in a solution that makes its particles fluoresce red and by blending these with a portion of unwashed material of the same initial type, and by varying these proportions batches can be numbered up to 999, each exactly alike in ingredients used. Each batch is thus composed of an identifiable mass of material.

Plastics which form the raw material clays of the potter have hitherto been practically unidentifiable as to their precise source in the bed and preliminary treatment in the factory before shipment to various potteries, whereas according to my invention now special selection or treatment to render the particles of one or more portions of the batch characteristic enables every batch to be made self-identifying.

Obviously the characteristic or characteristics which distinguish the component or components used for lot-identification purposes, must be of such nature that their characteristic function shall be substantially unaffected by the mere presence of the other material and that while they may change in color, fluorescence or other properties, they retain readily distinguishable characteristic differences and remain possessed of characteristically different properties throughout the reasonable life of the composition or at least until it is used as may be necessary.

Having described the characteristics of the composition, the principles on which the invention depends, and illustrated methods of carrying out those principles to produce varieties of my self-identifying composition, it is not intended to limit the scope of the invention to the application of any particular kind or group of material or materials, or to limit the distinctive character of identifying material as to kind of effect, or to limit the degree of effect to simple ratios or proportions, as the practice of the invention will develop other identifying materials, other useful characteristics, other ratios, and other suitable materials with which these may be blended to produce the new composition of matter.

I am aware that long threads have been used for the branding of a particular paper, or a particular brand of rope, or strand of wire, and oil has been branded with the maker's name or insignia by floating small letters or designs made of light material in the oil. However, so far as I am aware in these practices, there has been used or suggested no differentiation of different lots of substantially the same goods; no characteristic materials have been distributed with substantially perfect uniformity throughout the resulting composition in significantly predetermined and definitely varied proportions, and no cooperation has been used between two such significantly characteristic components in predetermined and varying proportions between two or more kinds of characteristic materials. Nor has any practicable means been suggested of compounding materials used in bulk in such a manner as to render self-identifying the successive lots of a series of substantially contemporaneous lots of the output of any composition.

This is a continuation in part of my application Serial No. 492,619, filed October 31, 1930.

What I desire to protect by Letters Patent and therefore claim, is:

1. The process of making a self-identifying composition of matter distinctively different in its various lots for purposes of identification, which consists in thoroughly blending in each lot thereof a distinguishable proportion of a characteristic kind of identifiable material, the proportion of which to that of the composition is distinctively related to that particular lot and distinguishably different from the proportion in other contemporaneous members of the series of lots of composition being made from these materials, thereby making the different lots of materials identifiable.

2. The process of making a self-identifying composition of matter distinctively different in its various lots for purposes of identification, which consists in thoroughly blending in each lot thereof a plurality of characteristic kinds of distinguishable material, each kind being in relative proportion distinguishable by the quantity of its particular kind of effect, which proportions of different kinds are distinctively related in that particular lot and are related differently from the proportions in other contemporaneous members of the series of lots of composition being made from these materials, thereby making the different lots of material identifiable.

3. The process of making lots of similar self-identifying bulk composition of matter which consists in blending in each lot thereof a plurality of different kinds of characteristic materials differing in their quantity of effect relation to one another and to the unit of bulk composition of matter from corresponding relations in other contemporaneous members of the series of lots of similar bulk composition.

4. The process of making lots of a similar self-identifying bulk composition of matter which consists in uniformly blending in each lot thereof a plurality of kinds of characteristic material in distinguishably different quantity of effect proportion to one another and to the unit of bulk composition, both of which proportional relations are distinctively related to the particular lot and differ from the proportional relations in other contemporaneous members of the series of lots of the self-identifying composition.

WILLIAM M. GROSVENOR.